(12) United States Patent
Nakashima

(10) Patent No.: US 6,182,204 B1
(45) Date of Patent: *Jan. 30, 2001

(54) PC CARD CAPABLE OF PROVIDING MULTIPLE AND/OR DIFFERENT CARD INFORMATION STRUCTURES TO A PERSONAL COMPUTER

(75) Inventor: Tatsuya Nakashima, Yokosuka (JP)

(73) Assignee: Murata Manufacturing Co., Ltd. (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/984,232

(22) Filed: Dec. 3, 1997

(30) Foreign Application Priority Data

Dec. 4, 1996 (JP) ..................................................... 8-339016

(51) Int. Cl.⁷ ..................................................... G06F 15/00
(52) U.S. Cl. ................................ 712/38; 712/1; 712/27; 712/39; 712/34; 712/43; 710/10; 710/14; 710/102
(58) Field of Search .................................. 712/1, 25, 27, 712/28, 29, 30, 43, 34, 38; 710/14, 10, 102

(56) References Cited

U.S. PATENT DOCUMENTS

| | | | |
|---|---|---|---|
| 5,329,491 | 7/1994 | Brown et al. | 365/185.33 |
| 5,572,683 * | 11/1996 | Epolite et al. | 395/284 |
| 5,613,092 * | 3/1997 | Lim et al. | 395/500 |
| 5,664,231 | 9/1997 | Postman et al. | 710/73 |
| 5,671,374 | 9/1997 | Postman et al. | 710/62 |
| 5,778,195 | 7/1998 | Gochi | 710/102 |
| 5,784,291 | 7/1998 | Chen et al. | 395/500.11 |
| 5,784,633 | 7/1998 | Petty | 710/60 |
| 5,797,024 * | 8/1998 | Gochi | 713/340 |
| 5,797,031 * | 8/1998 | Shapiro et al. | 395/828 |
| 5,805,929 | 9/1998 | Connolly et al. | 710/2 |
| 5,937,157 * | 8/1999 | Oshiyama et al. | 713/200 |
| 6,029,211 * | 2/2000 | Nakashima | 710/14 |

* cited by examiner

Primary Examiner—John A. Follansbee
Assistant Examiner—Dzung C. Nguyen
(74) Attorney, Agent, or Firm—Ostrolenk, Faber, Gerb & Soffen, LLP

(57) ABSTRACT

In the CIS installation area of a PC card, the A region contains the basic attribute information of the card, the B region contains data of CIS1 for a modem, and the C region contains CIS2 for an ATA memory. The PC card is provided with a selection signal input means which selectively designates the CIS. A selection signal discriminator receives a signal from the selection signal input means and determines the selective designation of the CIS. When CIS1 and CIS2 are selectively designated together, a CIS switch setting element sets the start of the CIS read-in by a personal computer to the leading address of CIS1, and when CIS2 only is selectively designated, it switchably sets the start of the CIS read-in by the personal computer to the leading address of CIS2.

9 Claims, 6 Drawing Sheets

PC CARD CAPABLE OF PROVIDING MULTIPLE AND/OR DIFFERENT CARD INFORMATION STRUCTURES TO A PERSONAL COMPUTER

BACKGROUND OF THE INVENTION

1. Field of the Invention

The present invention relates in general to a PC card, and more specifically to a multifunction-type PC card having a plurality of card information structures, or CISs, which constitute the functional attribute information of the PC card, and a CIS switching mechanism.

2. Description of the Related Art

Generally speaking a PC card contains circuitry for realizing its functions and a storage area for the CIS, which provides the functional attribute information of the card. Here the term "functions" is intended to refer to local area network (LAN) access, modem, memory, PHS, PDC, terminal adapter (TA), FM tuner, AM tuner, TV tuner, and the like.

FIG. 6A is a drawing showing the structure of a single-function PC card. The logic for realizing single function 1 and a single CIS corresponding to that function are contained within the PC card. When using this type of PC card, the user is required to change the PC card inserted into the PC card slot of a personal computer or the like in accordance with the purpose.

Alternatively, to avoid the inconvenience of changing PC cards, PC cards may be manufactured incorporating logic for the realization of a plurality of functions, as is shown in FIG. 6B. In this case the CIS contains functional attribute information corresponding to function 1 and function 2 respectively. When using this type of PC card, the PC must be provided with a card driver having multifunction capability, by means of which the two sets of functional attribute information resident in CIS1 are read into the personal computer memory, allowing the personal computer to recognize the two functions.

CISs are defined by rules conforming to PC card standards established by PCMCIA in the United States and by JEIDA in Japan, under which the CIS of a PC card is stored starting from the leading address of the CIS storage memory area. Further, the end of the CIS is indicated by a pre-determined delimiter.

When a multifunction-type PC card is inserted into the slot of a personal computer that does not have installed therein a driver with multifunction capability, the personal computer, in accordance with the above-cited standards, reads the CIS from the leading address of the CIS storage area up to the delimiter into the personal computer memory. The CIS corresponding to function 2, which is stored after the CIS corresponding to function 1, is not transferred to the personal computer memory. As a result, even though a multifunction-type PC card is inserted into the personal computer, the computer recognizes it as a single-function PC card having function 1.

When, on the other hand, a multifunction-type PC card is inserted into the PC card slot of a personal computer in which a driver with multifunction capability is installed, the computer reads in the plurality of CISs and activates the corresponding functions. That is to say, all the functions resident in the PC card inserted in the slot are activated, irrespective of whether they are actually used or not. This results in unnecessary consumption of power. Reducing power consumption is of particular importance in the case of battery-operated information equipment.

Let us consider an example of a PC card 1 having two functions: a modem and an ATA memory. The modem draws a current of approximately 120 mA and the ATA memory draws approximately 1 mA in standby mode. In common types of cards, the frequency of use of the ATA memory is higher than that of the modem. It is sufficient if the modem is activated only during the exchange of data with external systems. Nevertheless the PC card draws 121 mA of current at all times.

A related CIS-switching mechanism for a PC card is described in U.S. patent application Ser. No. 08/984,433 now U.S. Pat. Nos. 6,029,211 and 08/984,597, filed on even date herewith.

SUMMARY OF THE INVENTION

Accordingly it is an object of the present invention to provide a PC card that enables a personal computer to utilize all the functions resident in a multifunction-type PC card without the installation of a driver having multifunction capability, and that yet conforms to the specifications established by industry standards.

It is a further object of the present invention to provide a multifunction-type PC card in which only the desired function(s) is/are selectively activated, and power consumption is reduced.

The foregoing objects are achieved according to the present invention through the provision of a PC card provided with a plurality of functions, and a plurality of card information structures (CISs) each for a single function or a combination of functions among the plurality of functions, with common basic attribute information included, the PC card including: selection signal input means for inputting a CIS selection signal to the PC card; and a CIS switch setting element for discriminating the selection signal input by the selection signal input means, and switchably setting the CIS that was selected as the CIS to be transferred to an external computer.

The PC card may be configured such that the selection signal input means includes a switch installed on the PC card, and the turning on and off of the switch acts as the CIS selection signal.

The PC card may be configured such that the selection signal input means comprises a connector section provided on the PC card, and the connected signal and non-connected signal of a connector to the connector section acts as the CIS selection signal.

The selection signal input means may be formed of software for the external personal computer having a program that outputs the CIS selection signal.

The CIS switch setting element may switchably set the starting address for reading the CIS selected by the selection signal, thereby switchably setting the CIS to be read in by the external personal computer.

The present invention is so configured that the PC card is provided with a plurality of functions, and is provided with a plurality of CISs for those functions, either singly or in combination, the CIS to be selectively used is selectively designated by the selection signal input means from among that plurality of CISs, so that the selection signal switchably sets the designated CIS as the CIS to be read in by the personal computer, with the result that, when the personal computer is provided with a driver having multifunction capability, it is possible to use the CISs for the plurality of functions resident on the PC card at the same time, and furthermore to activate the CIS of only that single function that has been arbitrarily selected from among the plurality of functions.

Furthermore, when only a single CIS is selectively designated, the PC card is recognized as a single-function PC card in which only one CIS is resident so that only the selectively designated CIS is read in by the personal computer, with the result that when the function that is in use is active, the environment for the other functions that are not in use is not established, so that their circuitry is not energized, thereby making it possible to effect a major reduction in power consumption and realize low-energy utilization of the PC card.

Again, even when the personal computer is not provided with a driver having multifunction capability, it is possible to selectively designate by means of the selection signal input means only a single CIS, thereby switching from among the plurality of CISs resident in the PC card and switchably setting only the selectively designated CIS as the CIS to be read in by the personal computer, so that the personal computer reads in the selectively designated CIS in the same way as if the PC card were of the single-function type, containing only the selectively designated CIS, enabling the functions and operations corresponding to that CIS to be carried out, achieving an effect previously unobtainable, in that it is possible to use a multi-type PC card, even with a personal computer that does not have a driver with multifunction capability.

Further, in a PC card in which the selection signal input means is provided by a switch, the user of the personal computer can selectively designate the CIS according to the purpose, providing greater convenience of use, and since the position of the switch can be ascertained by external observation, with the effect that it is possible easily to determine which functional operations from among a plurality of PC card functions is being carried out by the personal computer.

Further, when the selection signal input means is provided by a connector section, it is possible to arrange a configuration such that when, for example, a communications connector is connected to the connector section, the CIS for a modem is automatically selectively designated, and when the communications connector is disconnected from the connector section, the CIS for a function other than the modem, such as, for example, an ATA memory, is automatically selectively designated.

Further, when the selection signal input means is provided by software on the personal computer, having a program that outputs the CIS selection signal, switches and other elements for selective designation of the CIS are unnecessary, thereby obviating the inconvenience of attaching switches or other elements to the PC card, with the effect that the cost of the PC card can be reduced.

Further, by means of a configuration in which CIS switching is carried out by switching the start address for the read-in of the CIS, the configuration of the CIS switching circuitry can be simplified and the action of CIS switching carried out more positively, with the effect of raising the reliability of CIS switching.

DETAILED DESCRIPTION OF THE PREFERRED EMBODIMENTS

According to the present invention, a PC card is loaded with a plurality of functions and the CISs for each of those functions, and that PC card is inserted into the slot of a personal computer. A signal for selecting the CIS of the function to be used from the plurality of functions is then input from the selection signal input means to the PC card.

A CIS switch setting element discriminates the selection signal that is input by the selection signal input means, determines which function (either a single function or a combination of functions) of the plurality of functions resident in the PC card is to be used, and switchably sets the CIS corresponding to the function to be used as the CIS to be read into personal computer memory. The personal computer reads the information on the CIS switched by the CIS switch setting element, energizing only the circuitry of the function to be used, thereby efficiently activating the selected function.

Following is a description of an embodiment of the present invention based on the drawings. In FIG. 2 there is shown a structure of an embodiment in accordance with the fundamental principle of the present invention, and in FIG. 1 there is shown the detailed structure of a CIS switching mechanism provided in controller 2 of FIG. 2.

In the PC card is stored the logic for realizing a plurality of functions, including modem, LAN, ATA memory and the like, namely function 1 through function N (N being an integer greater than 1). Therein are further stored the CISs corresponding each of these functions individually or to a combination of these functions, namely CIS1 through CISM (M being an integer greater than 1). Selection signal input means 4 may be a DIP switch or the like, and is switched by a user operation. Controller 2 sends to personal computer 3 the CIS that corresponds to the user-selected PC card function in accordance with the status of selection signal input means 4.

Figure 1:
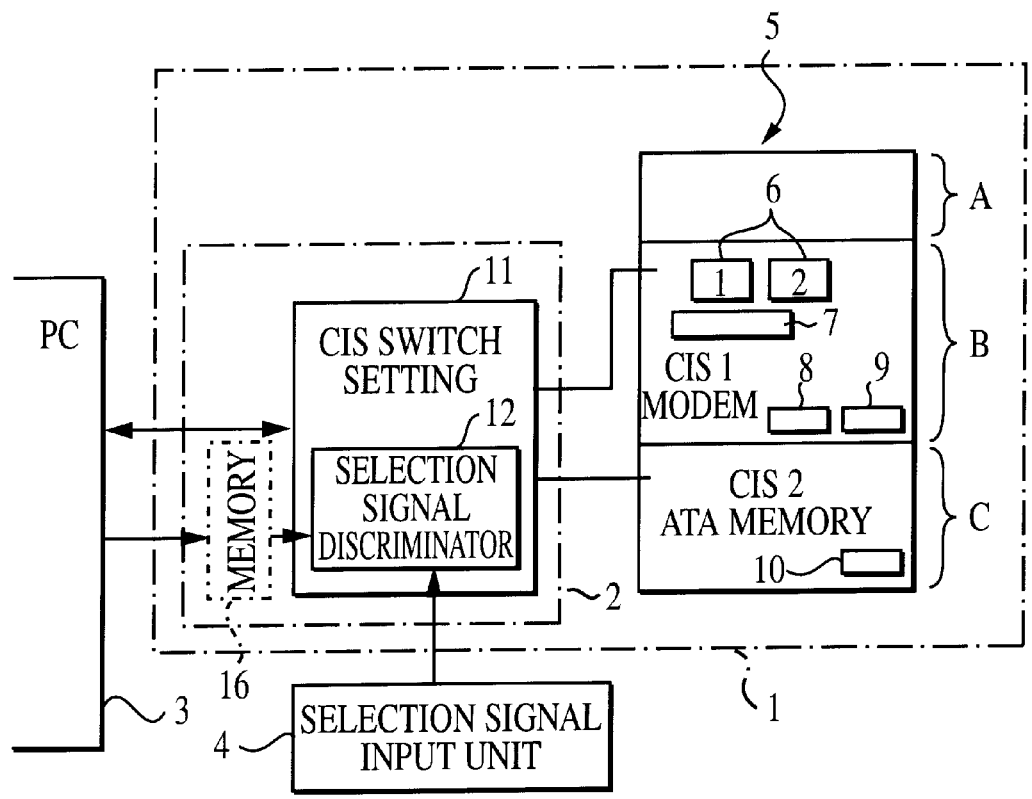
FIG. 1 is an explanatory drawing of the main elements of the first embodiment of the present invention.
Figure 2:
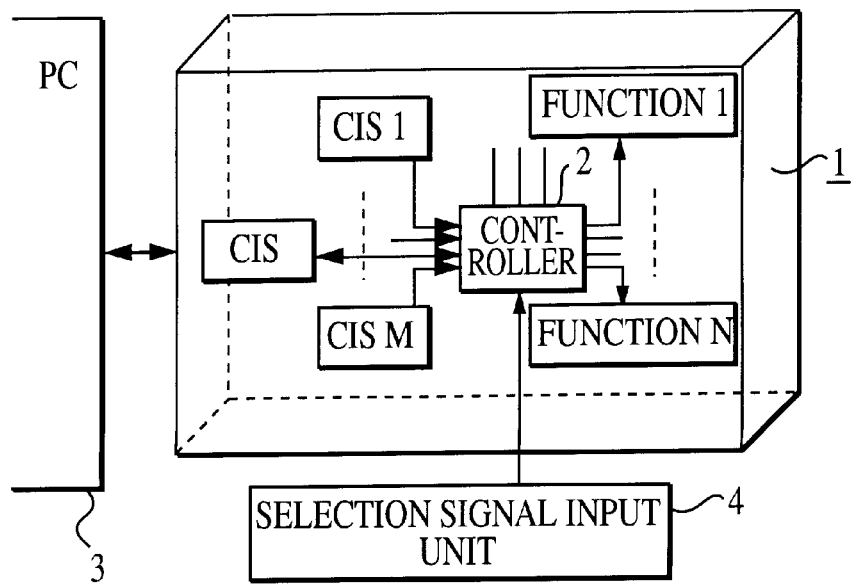
FIG. 2 is a structural drawing according to the fundamental principle of the present invention.

As shown in FIG. 1, the CISs for each of the functions are installed in installation area 5 of PC card 1, in accordance with rules conforming to card standardization protocols established by PCMCIA in the United States and JEIDA in Japan, as described hereinafter.

For simplicity, the following description relates to a PC card having two functions. In the A region, which starts from the leading address of memory 5, is stored the basic attribute information of PC card 1. This constitutes basic information relating to the PC card, such as the type of card, the type of attribute information, the format of the data array, and the like. In the B region, which follows the A region, is stored CIS1, which corresponds, for example, to a modem. In the C region is stored the data of CIS2, which corresponds, for example, to an ATA memory.

Following is a detailed description of the CIS data structure. In the B region are stored data indicating that the data of CIS1 for function 1, a modem, and that of CIS2 for function 2, an ATA memory, are stored in area 6 of the PC card. The addresses of CIS1 are stored in area 7. CIS1 is stored in the area following area 7. In area 8 at the end of CIS1 is stored an end code. In area 9 is stored the address of CIS2. CIS2 is stored from the leading address in the C region. Analogously to CIS1, an end code is stored in area 10 at the end.

Controller 2 is provided with a CIS switch setting element 11, which has a selection signal discriminator 12.

Selection signal discriminator 12 determines the CIS selected by the user according to the selection signal from selection signal input means 4. The user at selection signal input means 4 may select either a single function or a plurality of functions.

Based on the result of processing by selection signal discriminator 12, CIS switch setting element 11 switchably sets the CIS that was selectively designated by the selection signal as the CIS to be read by personal computer 3. When, for example, the use of both modem and ATA memory is selectively designated by the selection signal, that is to say, when both CIS1 and CIS2 are selectively designated together, the leading address for read-in of the CIS by personal computer 3 is set at the leading address of CIS1.

Based on the CIS switch setting of CIS switch setting element 11, personal computer 3 begins read-in from the basic information on card attributes in the A region, and when read-in of the data in the A region has been completed, begins the read-in of data from the leading address of the B region set by CIS switch setting element 11. By means of this read-in of data, the data in area 6 is read in and storage therebelow of the data for the CISs of the modem and ATA memory is confirmed, and the data for CIS1 relating to the modem is read in by the computer from the starting position indicated in area 7. Then, by means of the read-in of the data in the final area 8, the ending of the CIS1 data array is recognized, the starting address of the data for CIS2 relating to the ATA memory in the C region is indicated, and the CIS2 is in turn read by personal computer 3. Then the data indicating the end in area 10 is read in, and the read-in of the CIS data resident in installation area 5 is completed.

By reading in the CIS1 and CIS2 data in the B and C regions respectively, personal computer 3 establishes an environment in which the modem and ATA memory may be used at the same time.

When, on the other hand, selection signal discriminator 12 determines that CIS2 alone has been selectively designated by the selection signal, signifying the use of the ATA memory only, CIS switch setting element 11 switchably sets the leading address of the CIS to be read in by personal computer 3 to be the leading address of the CIS2 data. As a result, when personal computer 3 completes read-in of the basic attribute information resident in the A area, it proceeds to read in CIS2 data from the leading address for CIS2 data in the C region set by CIS switch setting element 11, and when the data signifying the end, which is resident in area 10, has been read in, the read-in of the CIS information resident in CIS installation area 5 is completed.

Figure 3:
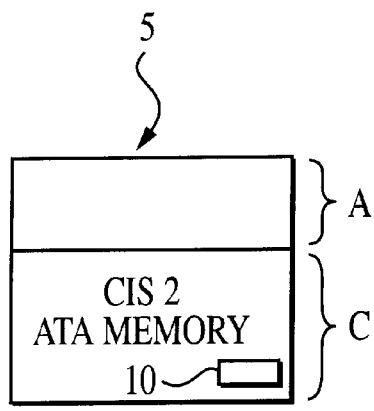
FIG. 3 is an explanatory drawing in which there is shown the structure of a PC card wherein only one of a plurality of CISs installed in the PC card is selectively designated.

That is to say, when this CIS2 only is selectively designated, as shown in FIG. 3, in CIS installation area 5, just as the data for CIS2 in the C region follows after the data in the A region, the PC card is recognized as if it were a single-function ATA memory card, and personal computer 3 reads in the data in the A and C regions. As a result personal computer 3 establishes an environment for activating ATA memory, so that the circuitry relating to the ATA memory alone is energized, without establishing an environment for energizing the circuitry relating to the modem.

Thus in accordance with the present embodiment it is possible, by the use of a PC card having the two functions of modem and ATA memory, to make use of both the modem and ATA memory functions, as well as to use the ATA memory alone. When only the ATA memory is used, the data for CIS1 for the modem is not read into personal computer 3, so that personal computer 3 energizes the circuitry in the same way as if the PC card were a single-function card having the function of ATA memory only. Since the modem circuitry is not energized while the ATA memory is in use, it is possible to eliminate the current drain associated with operating the modem circuitry.

Figure 4:
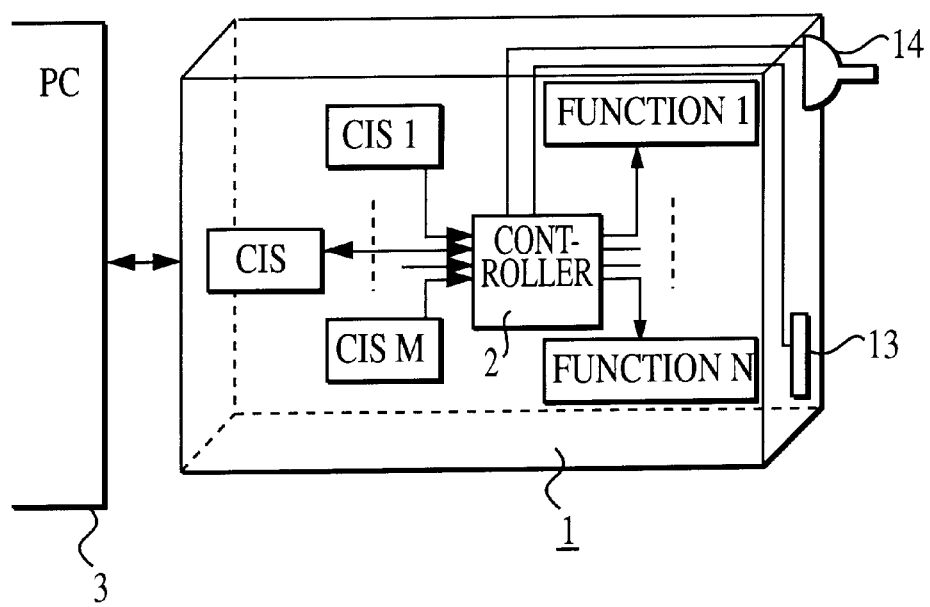
FIG. 4 is an explanatory drawing of an embodiment of the present invention wherein the selection signal input means is provided by a switch 13 and a connector section 14.

The embodiment recited above described a case in which personal computer 3 is provided with a driver having multifunction capability. But even when personal computer 3 is not provided with a driver having multifunction capability, the inputting from selection signal input means 4 of a selection signal for CIS2, signifying use of the ATA memory only, as shown in FIG. 1, for example, CIS switch setting element 11 switchably sets the leading address for the read-in of the CIS, so that personal computer 3 reads in the data for CIS2 as shown in FIG. 3, in the same way as if the PC card used were a single-function card for ATA memory only, thereby obtaining the effect that, even if personal computer 3 is not provided with a driver having multifunction capability, it is possible to use, as in the example in FIG. 1, the ATA memory when using a multi-type PC card In FIG. 4 there is shown a specific example of selection signal input means 4. PC card 1 is provided with a switch 13 and a connector section 14, either one (or both) of which may be made to function as selection signal input means 4.

When switch 13 serves as selection signal input means 4, the on signal of switch 13 might, for example, be made to act as the signal for selectively designating both CIS1 for the modem and CIS2 for the ATA memory, and the off signal of switch 13 to act as the selection signal that selectively designates only CIS2 for the ATA memory.

By means of the configuration above described, selection signal discriminator 12 determines that when an on signal is applied from switch 13, both CIS1 and CIS2 have been selectively designated, and that when an off signal is applied from switch 13, only CIS2 has been selectively designated. Then, on the basis of the determination by selection signal discriminator 12, CIS switch setting element 11 switchably sets the CIS to be read-in by personal computer 3, so that, by turning switch 13 on, the modem and ATA memory may be used at the same time, and by turning switch 13 off, the ATA memory may be used alone.

When connector section 14 serves as selection signal input means 4, a configuration is adopted in which the connect signal produced when a connector for effecting communication is connected to connector section 14 might, for example, be made to act as the selection signal of both CIS1 for the modem and CIS2 for the ATA memory, and the non-connect signal produced when a connector for effecting communication is not connected to connector section 14 to act as the signal for the selection signal of only CIS2 for the ATA memory, As a result, by connecting a data transmission connector to connector section 14, selection signal discriminator 12 determines that both CIS1 and CIS2 have been selectively designated as the CISs to be read by personal computer 3, with the result that CIS switch setting element 11 switchably sets CIS1 and CIS2 as the CISs to be read into personal computer 3.

Again, when the data transmission connector is disconnected from connector section 14, selection signal discriminator 12 determines that only CIS2 has been selectively designated, with the result that CIS switch setting element 11 selectively designates CIS2 only as the CIS to be read into personal computer 3, and only the ATA memory is activated.

In a configuration in which switch 13 acts as selection signal input means 4 and a plurality of CISs are resident in PC card 1, a corresponding plurality of switches 13 may be provided. When connector section 14 acts as selection signal input means 4, PC card 1 need not be provided with switch 13.

Figure 5:
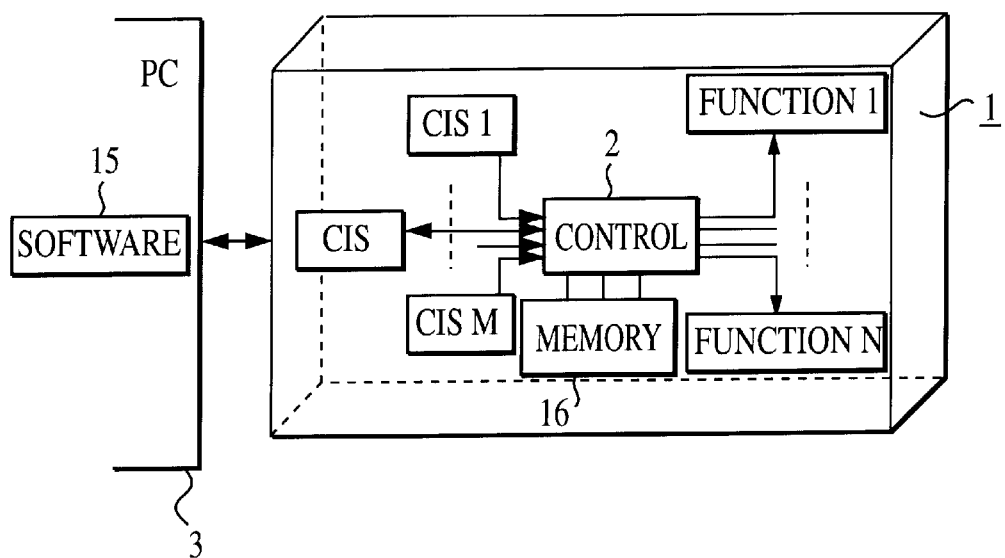
FIG. 5 is an explanatory drawing of an embodiment of the present invention wherein the selection signal input means is provided by software 15 of personal computer 3.
Figure 6A:
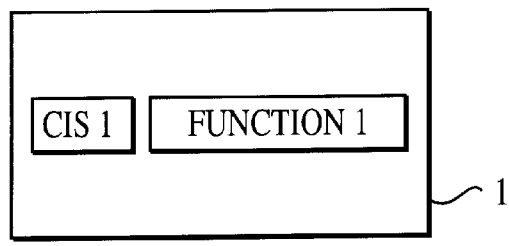
FIG. 6 is an explanatory drawing in which there are shown the functions and the installation configuration of the CIS in conventional single-type and multi-type PC cards.
Figure 6B:
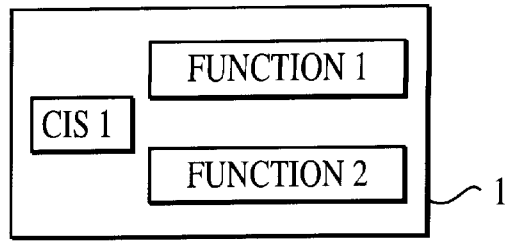

In FIG. 5 there is shown an example in which selection signal input means 4 is provided by software 15 having a program that outputs a switch signal, for use on personal computer 3. In the example shown in FIG. 5, there is provided in PC card 1 a memory 16 for the storage of the switch signal output by software 15. The switch signal stored in memory 16 is then read out by selection signal discriminator 12, and based on the switch signal, selection signal discriminator 12 determines, in a manner analogous to that described in FIG. 4, whether both CIS1 and CIS2 have been selectively designates, or only CIS2 has been selectively designated. Then, based on the result of processing by selection signal discriminator 12, CIS switch setting element 11 switchably sets the CIS(s) selectively designated as the CIS(s) to be read by personal computer 3, thereby toggling in accordance with the switch signal of software 15 between use of the modem and ATA memory at the same time and use of the ATA memory singly.

Figure 7:
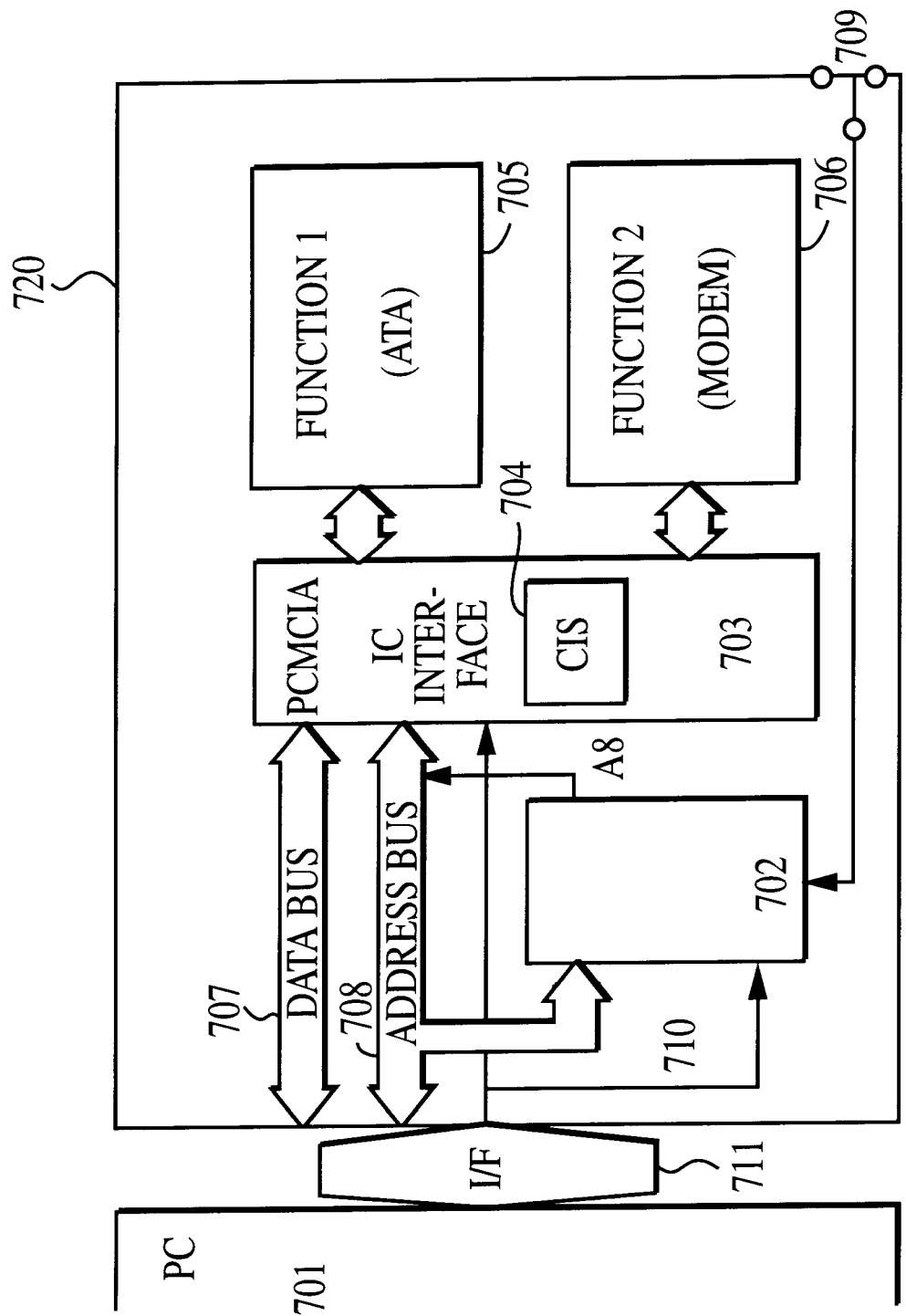
FIG. 7 is a block diagram showing a specific configuration of a PC card according to the present invention.
Figure 8:
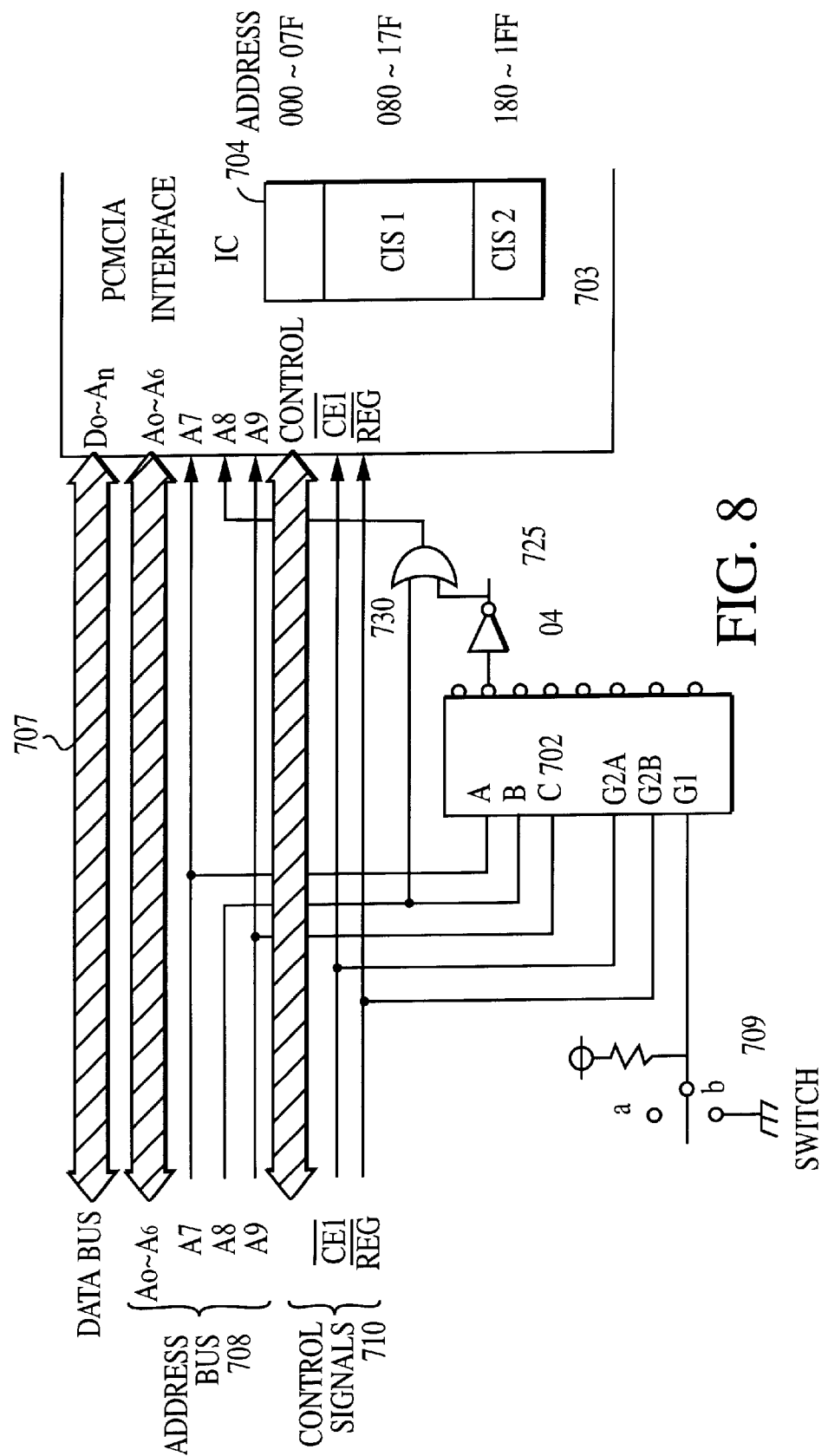
FIG. 8 is a more detailed representation of the block diagram of FIG. 7

FIG. 7 is a block diagram in which there is shown a specific configuration of a PC card according to the present invention. A personal computer 701 and a PC card 720 communicate via an interface 711. A data bus 708, address bus 707 and control signal 710 within PC card 720 are connected to interface 711. CIS 704 is stored in the memory of PCMCIA interface IC 703. Address bus 707 and control signal 710, and switch 709 are connected to CIS switch setting IC 702. Depending on the status of switch 709, CIS switch setting circuit 702 switches addresses, enabling the CIS corresponding to the function selected to be accessed from the personal computer. Following is a specific description. FIG. 8 is a more detailed representation of the block diagram of FIG. 7.

Figure 10:
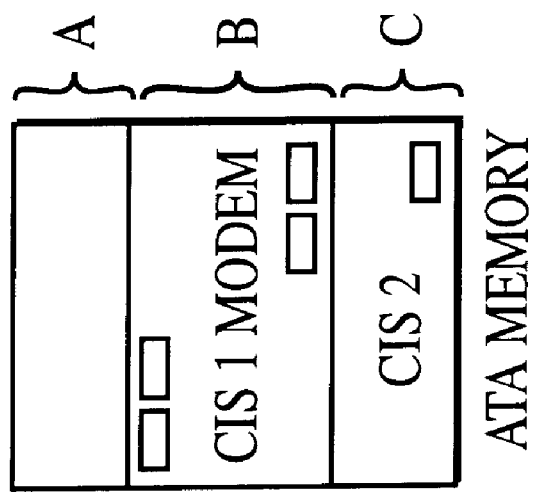
FIG. 10 is an explanatory drawing in which switch 709 is set to side "b".

When switch 709 is set to side "b," (FIG. 10) switch setting IC 702 is disabled and the outputs of the IC go high. Output 725 matches input A8. Accordingly when the CIS within the PCMCIA interface IC is being accessed, no address conversion is made.

Figure 9:
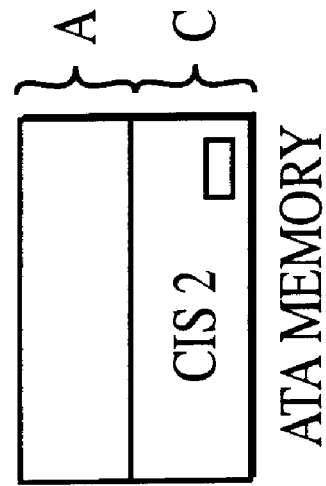
FIG. 9 is an explanatory drawing in which switch 709 is set to the "a".

When switch 709 is now set to the "a" side (FIG. 9), switch setting IC 702 is enabled. When, for example, personal computer 701 accesses CIS address 080-OFF, the output switch setting IC 702 goes low, output 725 goes high, and input A8 goes high. If personal computer 701 accesses address 080-0FF at this time, address conversion occurs and address 180-1FF in the PCMCIA interface IC is accessed. That is to say, the information on CIS2 is transferred to the personal computer.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A PC card, comprising:
   a plurality of functions;
   a memory;
   a plurality of card information structures (CISs) stored in said memory, each for a single function or a combination of said functions, all CISs sharing at least some common basic attribute information and said CISs being arranged in said memory such that said CISs are stored in an order in which their corresponding functions consume power;
   a selection signal input device which inputs a CIS selection signal into said PC card, said CIS selection signal identifying which of said CISs is to be selected; and
   a CIS switch setting element discriminating said CIS selection signal and switchably setting the selected CIS to be transferred to an external computer as a function of the CIS selection signal.

2. A PC card as recited in claim 1, wherein said selection signal input device comprises a switch installed on said PC card, and turning on and off said switch acts as said CIS selection signal.

3. A PC card as recited in claim 1, wherein said selection signal input device comprises a connector section provided on said PC card, said CIS selection signal being based on one of a connected signal and a non-connected signal of a connector to said connector section.

4. A PC card as recited in claim 1, wherein said selection signal input device comprises software for said external personal computer having a program that outputs said CIS selection signal.

5. A PC card as recited in claim 1, wherein said CIS switch setting element switchably sets a starting address for reading the CIS selected by said selection signal, thereby switchably setting the CIS to be read in by said external personal computer.

6. A PC card, comprising:
   a plurality of functions;
   a plurality of card information structures (CISs), each for a single function or a combination of said functions and all CISs sharing at least some common basic attribute information;
   a selection signal input device which inputs a CIS selection signal into said PC card, said CIS selection signal identifying a plurality of said CISs to be selected, said selection signal input device including a connector section provided on said PC card, said CIS selection signal being based one of a connected signal and non-connected signal of a connection to said connector section; and
   a CIS switch setting element discriminating said CIS selection signal and switchably setting the selected CIS to be transferred to an external computer as a function of the CIS selection signal.

7. A PC card as recited in claim 6, wherein said selection signal input device comprises a switch installed on said PC card, and the turning on and off of said switch acts as said CIS selection signal.

8. A PC card as recited in claim 6, wherein said selection signal input device comprises software for said external personal computer having a program that outputs said CIS selection signal.

9. A PC card as recited in claim 6, wherein said CIS switch setting element switchably sets a starting address for reading the CIS selected by said selection signal, thereby switchably setting the CIS to be read in by said external personal computer.

* * * * *